(12) United States Patent
García Nieto et al.

(10) Patent No.: US 11,052,996 B2
(45) Date of Patent: Jul. 6, 2021

(54) LIFTING SURFACE

(71) Applicant: Airbus Operations S.L., Getafe (ES)

(72) Inventors: Carlos García Nieto, Getafe (ES); Iker Vélez De Mendizábal Alonso, Getafe (ES); Soledad Crespo Peña, Getafe (ES); Enrique Guinaldo Fernández, Getafe (ES); Jesús Javier Vázquez Castro, Getafe (ES); Álvaro Torres Salas, Getafe (ES)

(73) Assignee: Airbus Operations S.L., Getafe (ES)

( * ) Notice: Subject to any disclaimer, the term of this patent is extended or adjusted under 35 U.S.C. 154(b) by 796 days.

(21) Appl. No.: 15/872,460

(22) Filed: Jan. 16, 2018

(65) Prior Publication Data
US 2018/0201361 A1 Jul. 19, 2018

(30) Foreign Application Priority Data
Jan. 17, 2017 (EP) .................................. 17382018

(51) Int. Cl.
*B64C 21/08* (2006.01)
*B64C 23/06* (2006.01)
*B64C 21/10* (2006.01)

(52) U.S. Cl.
CPC .............. *B64C 21/08* (2013.01); *B64C 21/10* (2013.01); *B64C 23/06* (2013.01); *B64C 2230/08* (2013.01); *B64C 2230/26* (2013.01); *Y02T 50/10* (2013.01)

(58) Field of Classification Search
CPC ............ B64C 2230/08; B64C 2230/26; B64C 2230/20; B64C 23/06
See application file for complete search history.

(56) References Cited

U.S. PATENT DOCUMENTS

| 2,951,662 | A | * | 9/1960 | Theodorsen | ............ | B64C 21/04 244/207 |
| 3,261,576 | A | * | 7/1966 | Emery | .................... | B64C 23/00 244/130 |
| 3,586,267 | A | | 6/1971 | Ingelman-Sundberg | | |
| 5,755,408 | A | | 5/1998 | Schmidt et al. | | |

(Continued)

FOREIGN PATENT DOCUMENTS

WO    WO 99/50141    10/1999

OTHER PUBLICATIONS

Search Report for EP17382018.4, dated Jun. 22, 2017, 7 pages.

*Primary Examiner* — Brian M O'Hara
(74) *Attorney, Agent, or Firm* — Nixon & Vanderhye P.C.

(57) ABSTRACT

A lifting device including: a movable discontinuity (1) located in a surface of the lifting device, the movable discontinuity (1) being movable between: an active position in which the movable discontinuity (1) acts as vortex generator, and a passive position in which the movable discontinuity (1) is integrated into the surface of the lifting surface, a conduit (2) located in the spanwise direction of the lifting surface and in communication with the movable discontinuity (1), the lifting surface including openings (3) in its surface spanwise distant from each other in communication with the conduit (2), the movable discontinuity (1) and the conduit (2) being configured such that when an airflow goes through the conduit (2), this airflow activates the movable discontinuity (1) to act as a vortex generator of the lifting surface.

16 Claims, 6 Drawing Sheets

(56) References Cited

U.S. PATENT DOCUMENTS

| | | | | |
|---|---|---|---|---|
| 6,105,904 | A * | 8/2000 | Lisy | B64C 23/06 |
| | | | | 244/200.1 |
| 6,209,824 | B1 * | 4/2001 | Caton | B64C 9/02 |
| | | | | 244/213 |
| 8,152,109 | B2 * | 4/2012 | Silich | B64C 15/14 |
| | | | | 244/208 |
| 10,730,611 | B2 * | 8/2020 | Utt | B64C 13/40 |

* cited by examiner

LIFTING SURFACE

RELATED APPLICATION

This application claims priority to European Patent Application No. 17382018.4 filed Jan. 17, 2017, the entirety of which is incorporated by reference.

FIELD OF THE INVENTION

The invention is related to a aerodynamic lifting surfaces, such as airfoils, having vortex generators.

BACKGROUND OF THE INVENTION

A vortex generator on an aerodynamic surface typically is a small vane or bump that creates a vortex flowing over the surface. Vortex generators delay separation of the airflow from the surface and delay aerodynamic stalling of the surface, and thereby improve the effectiveness of the aerodynamic surface in providing lift and control to an aircraft.

Vortex generators are positioned on an aerodynamic surface in such a way that the generators have an angle of attack with respect to the airflow local to the generator and the surface on which is is positioned. A vortex generator creates a tip vortex which draws energetic, rapidly-moving air from outside the slow-moving boundary layer into contact with the aircraft skin. The boundary layer normally thickens as it moves along the aircraft surface, reducing the effectiveness of trailing-edge control surfaces. Vortex generators can be used to remedy this problem, among others, by re-energizing the boundary layer allowing the airfoil to operate at higher angles-of-attack without airflow separation.

In terms of aircraft operability, the main benefits of using these devices apply to:

(i) Increment in maximum take-off weight.
(ii) Increment in maximum landing weight.
(iii) Aircraft noise reduction.
(iv) Efficiency increment of aircraft control surfaces.

Although vortex generators are known and have been used for over many years, they continue being one of the most effective flow control devices. Nevertheless, it is also known that if they are fixed for improving performance in one flight regimen, they use to penalize the performance in other operational conditions.

SUMMARY OF THE INVENTION

A control surface has been conceived and is disclosed herein that includes a movable discontinuity located in the surface of the lifting surface; the movable discontinuity being movable between: (a) an active position in which the movable discontinuity acts as vortex generator, and (b) a passive position in which the movable discontinuity is integrated into the surface of the lifting surface without acting as vortex generator, a conduit located in the spanwise direction of the lifting surface and being located in communication with the movable discontinuity, the lifting surface comprising at least two openings in its surface spanwise distant from each other in communication with the conduit such that when the openings are open an airflow enters through one of the openings and exits from the other opening, the movable discontinuity and the conduit being configured such that when an airflow goes through the conduit, this airflow activates the movable discontinuity to act as a vortex generator of the lifting surface.

The circulation of the airflow is possible both due to an active opening and closing of the openings or through a passive action due to the existence of a spanwise pressure gradient in the upper and lower faces of the lifting surface.

The openings may be located in the trailing edge. As the two openings are spanwise separated a given distance, when the openings are open, due to the aforementioned pressure gradient, an airflow goes along the conduit. An internal air current is created by pressure difference between two "trailing edge" span positions with openings.

DESCRIPTION OF THE FIGURES

To complete the description and in order to provide for a better understanding of the invention, a set of drawings is provided. Said drawings form an integral part of the description and illustrate preferred embodiments of the invention. The drawings comprise the following figures.

DETAILED DESCRIPTION OF THE INVENTION

Figure 1:
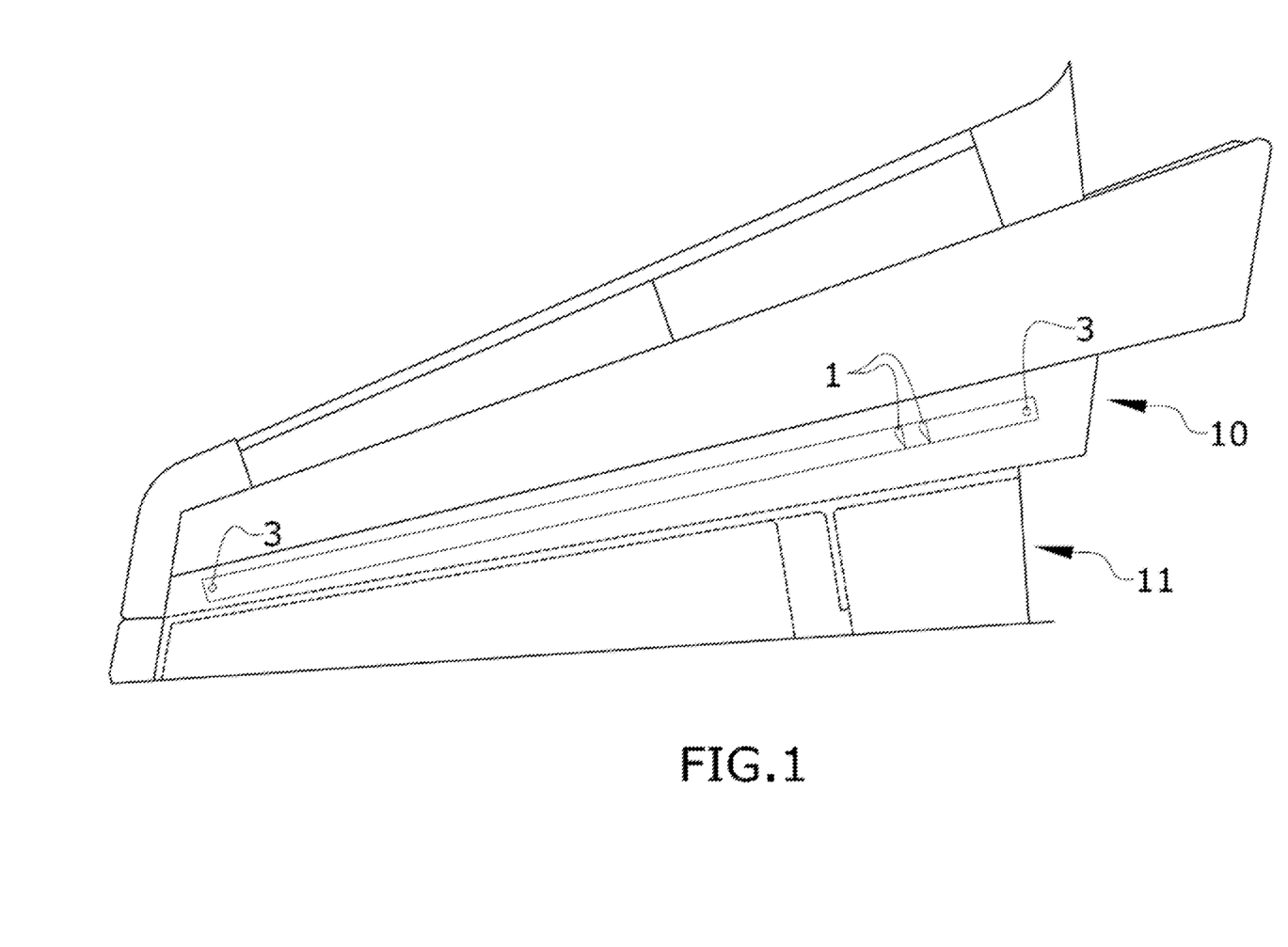
FIG. 1 shows a schematic perspective view of a lifting device having a trailing edge and a control surface.
Figure 2:
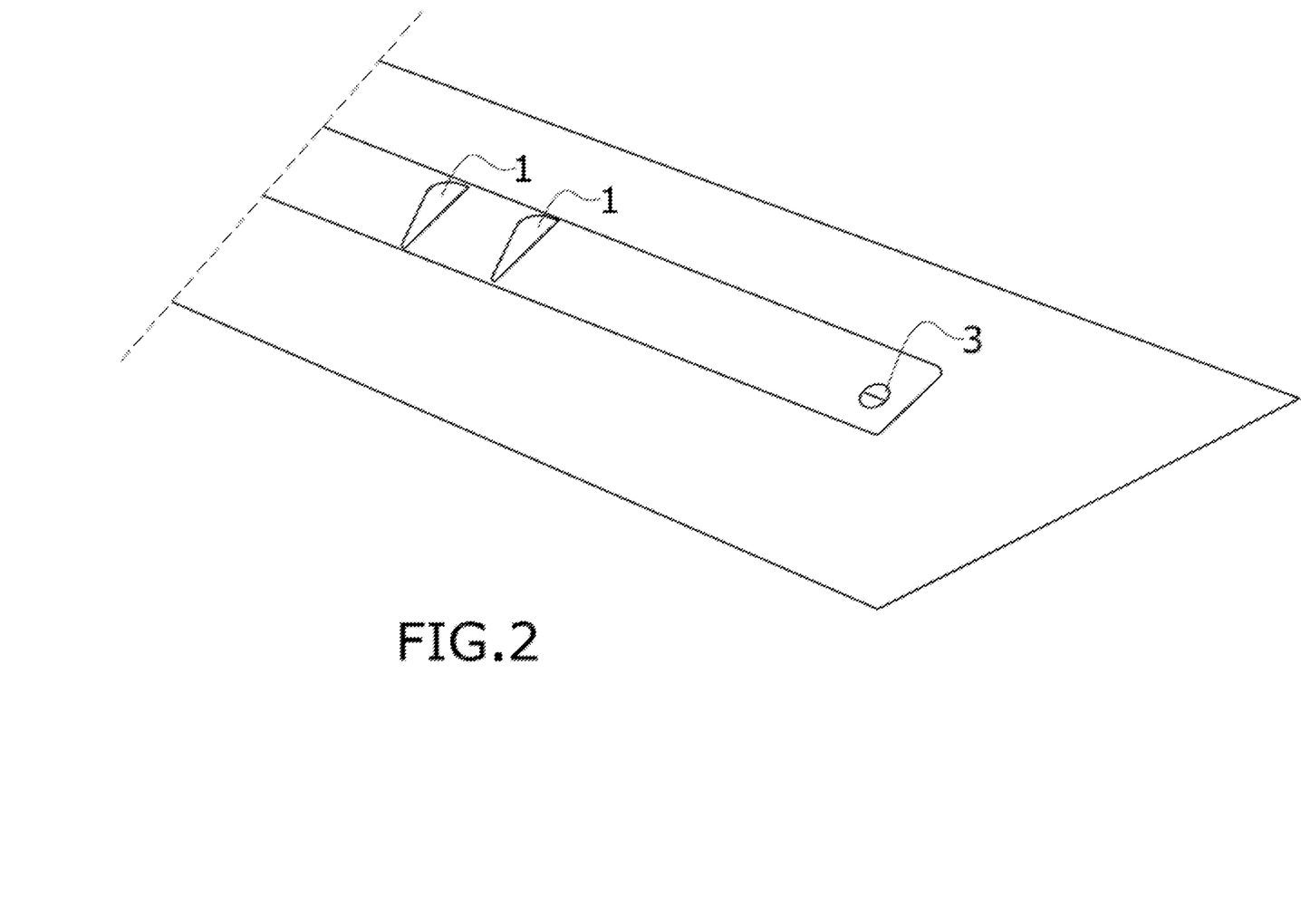
FIG. 2 shows a schematic perspective view of a part of the surface of a lifting device.
Figure 6:
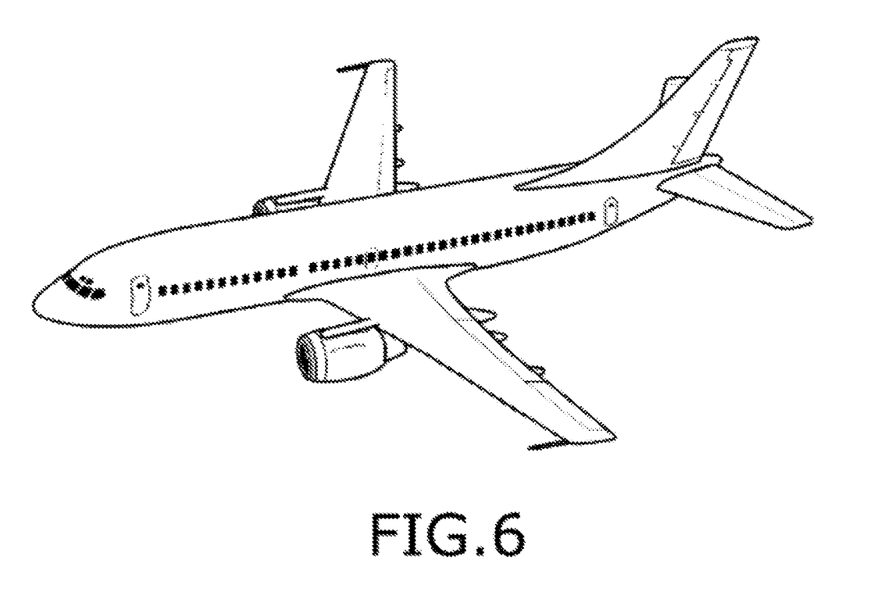
FIG. 6 shows an aircraft having a lifting surface according to the invention.

FIG. 1 shows a schematic perspective view of a complete lifting device, such as an airfoil of a wing, e.g. wingbox, of an aircraft (FIG. 6), having a trailing edge (10) and a control surface (11). FIG. 2 shows a schematic perspective view of a a part of the surface of the lifting surface shown in FIG. 1.

There are two movable discontinuities (1) located on the surface of the trailing region (10) of the lifting device. The discountinuities are upstream of the control surface (11) in the direction of the airflow moving in a chordwise direction over a suction (negative pressure) region of a surface of the lifting device.

Two openings (3) are on the surface wherein the openings are separated from each other along a spanwise direction of the lifting device. The openings may be in fluid communication with a conduit (2) below the surface and in the lifting device. There may be more than two openings (3) on the surface.

By controlling the opening and closing of the openings (3) airflow through the conduit is controlled which controls the activation of the movable discontinuities (1). The opening and closing of the openings (3) can be made actively or passively. For example, the openings may be activated by a control or command, or be activated by passive means related to the pressure gradient on the lifting device.

Figure 3A:
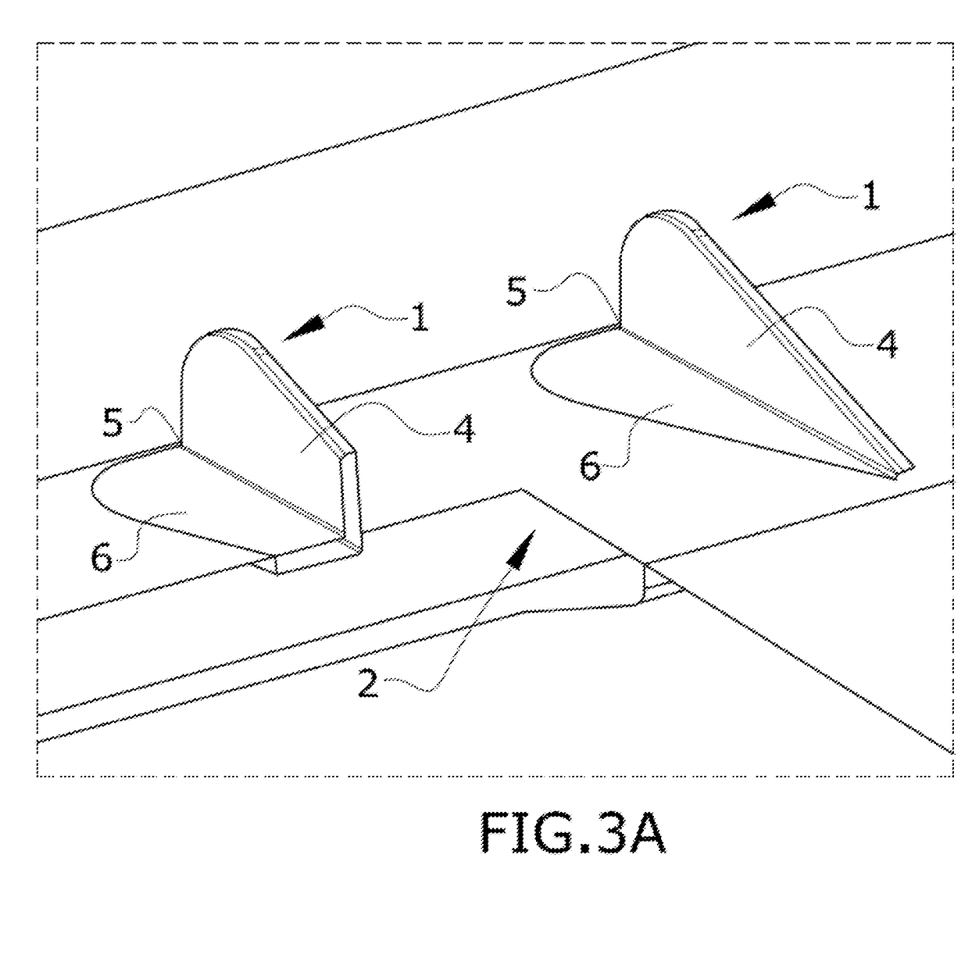
FIGS. 3A and 3B show a schematic illustrations of a perspective view (3A) and of a cross section (3B) of a first embodiment of the discontinuities and a conduit.
Figure 3B:
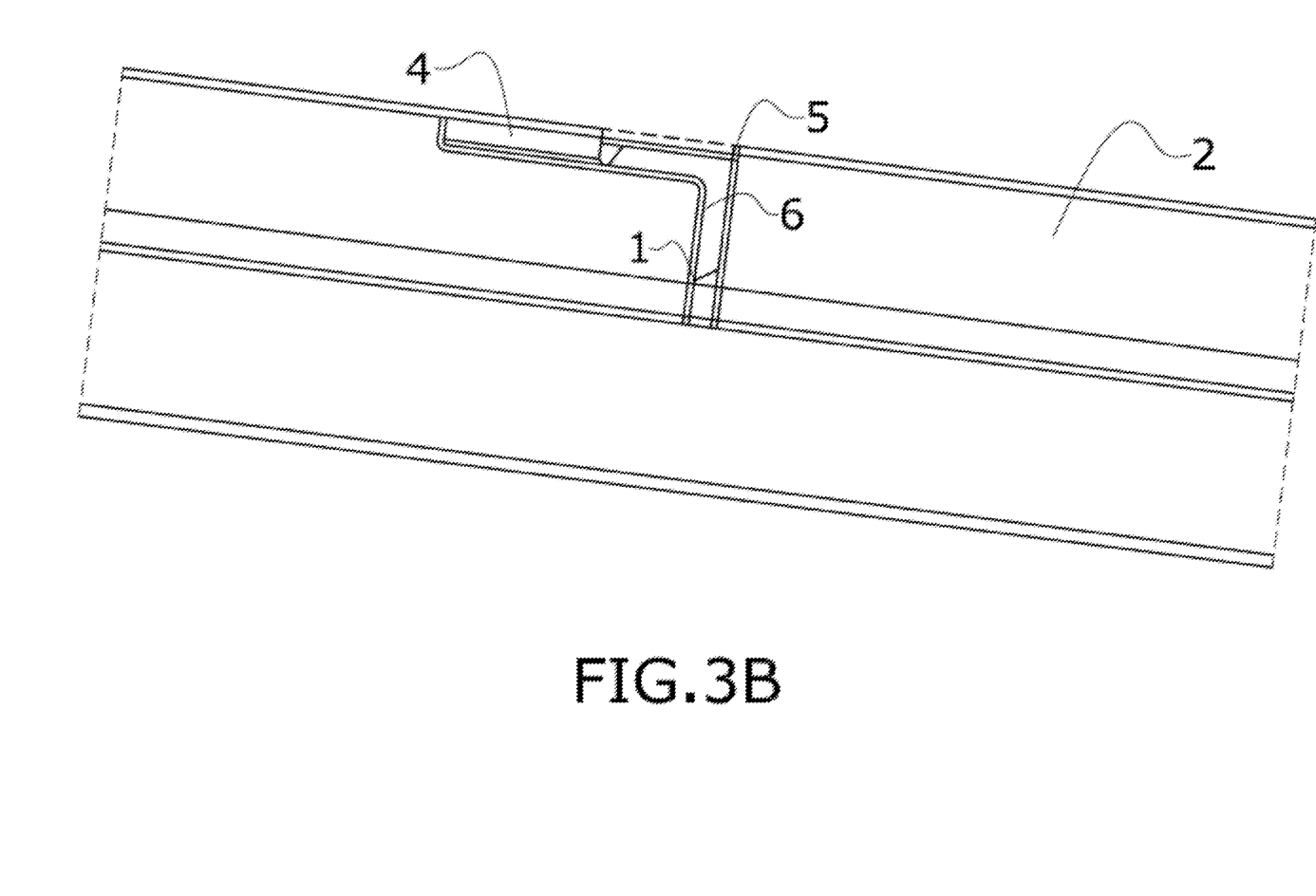

FIGS. 3A and 3B show the spanwise conduit (2) and a first embodiment of the discontinuities (1). FIG. 3A shows the movable discontinuity (1) in an active position and FIG. 3B in a passive position.

The movable discontinuity (1) comprises a first part (4) movable between an active position in which it is deployed from the surface of the lifting surface and a passive position in which it is located into a recess of the lifting surface keeping the continuity of the skin as shown in FIG. 3B. The movable discontinuity (1) comprises a hinge line (5) for moving the first part (4) between the active and passive positions. The movable discontinuity (1) further comprises a second part (6) movable between an active position in which it is located in the recess of the lifting surface thus covering said recess and a passive position in which it is located in the conduit (2). The second part (6) therefore covers the orifice left by the deployment of the first part (4) and therefore when the vortex generator is out of the recess, said recess remains covered.

The first part (4) of the discontinuity (1) may be a vane having a generally triangular shape with a leading edge that is at or near a surface (skin) of a wing and the tall (wide) region of the vane is at its trailing edge. The vave extends into the airflow moving over the surface while the discontinuity is in the active position. The hinge line (5) is at an edge of the vane (4) aligned with the surface of the lifting device. The hinge line may form a hinge between the discontinuity and the lifting device. The hinge line (5) allows the first part (vane—4) to pivot from an upright position shown in FIG. 3A and a laid down position in which the vane is seated in a recess or opening in the surface and the vane becomes part of a continuous surface of the lifting device. The hinge line may extend in a chordwise direction. The second part (6) is a cover and may have a shape similar to the first part (vane—4). The second part (6) is seated in the recess while the first part (4) extends upward from the surface of the lifting device. The second part extends downward into the conduit while the first part (4) is seated in the recess. The second part and first part are fixed and pivot together about the hinge line. The first and second part may be a single piece intregal device.

The air flowing in the interior of the conduit (2) pushes second part (6) and causes the second part to pivot such that it is seated in the recess. The pivoting of the second part causes the first part (4) to pivot from the recess and extend outward from the surface of the lifting device. While the first part (4) extends outward it acts as a vortex generator with respect to the airflow over the surface of the lifting device, such as the portion of the surface exposed to a suction (negative pressure).

The first and second parts (4, 6) may include detents or ridges to act as stops that engage the recess to prevent overotation of the discontinuity.

The shape of the first part (4) may be rectangular, triangular, semi-oval, parabolic, gothic, or inverse triangular. The shape of the first part is selected to cause the first part to form a vortex genitor when the first part is deployed.

Figure 4:
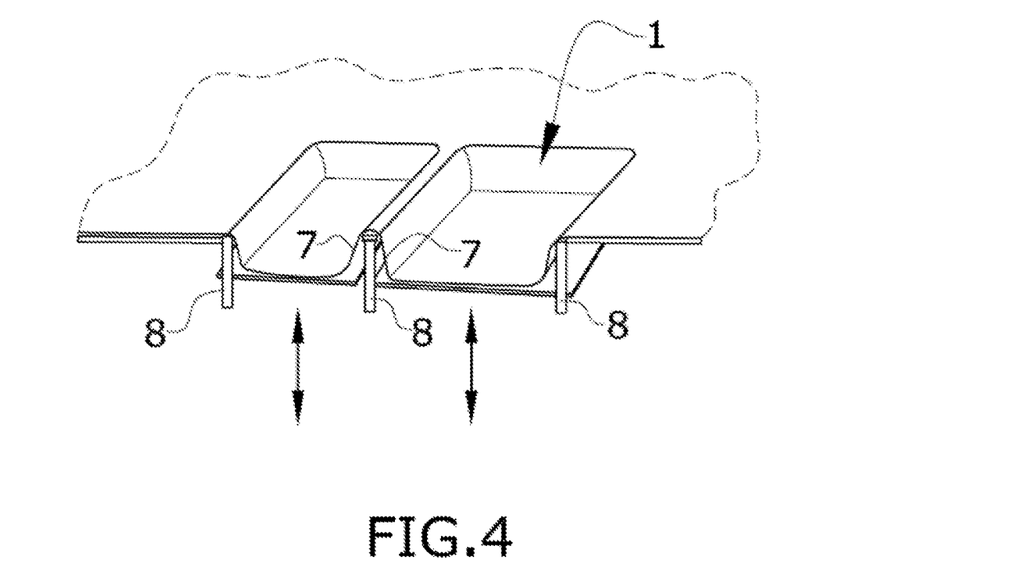
FIG. 4 shows a schematic perspective view from the upper face of the upper skin of a lifting surface showing another embodiment of two movable discontinuities in an active position.
Figure 5:
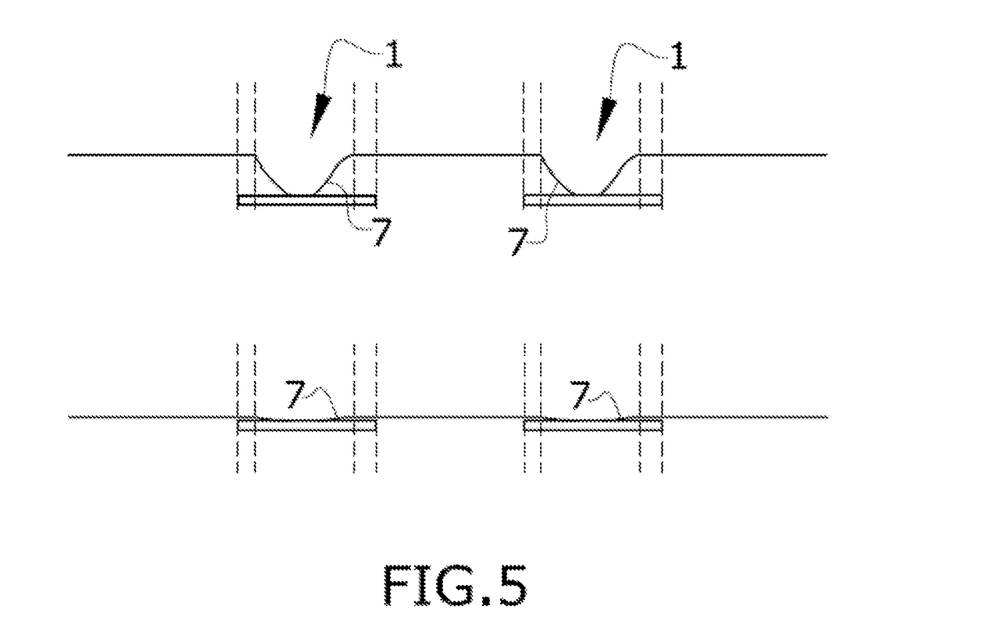
FIG. 5 shows a schematic transversal view of two movable discontinuities in an active and a passive position.

FIGS. 4 and 5 show another embodiment of the movable discontinuities (1). The discontinuity (1) shown in FIGS. 4 and 5 include a flexible skin (7) of the lifting surface. The flexible skin (7) is movable between a passive position in which the skin is flush, e.g., continuous with, the profile of the lifting surface. The flexible skin has an active position in which it departs from the surface of the lifting surface.

The flexible skin (7) is sucked into the conduit and thereby forms a recess in the surface of the lifting device. The recess forms a vortex generator because the recess disrupts the airflowing over the surface of the lifting device. The recess(es) may be formed between consecutive ribs (8) of the lifting device, e.g., wing. The recess(es) may also be in the trailing edge region (10) of the lifting device.

The flexible skin (7) is moved from being a continuous surface, e.g., in the same plane, as the surface for the lifting device and forming recess(es) in the surface. The flexible surface (7) is moved in responses changes in the internal suction (pressure) in the conduit (2). When the openings (3) are closed and there is no airflow thought the conduit, the pressure in the conduit is relatively great and the flexible skin is continuous with the surface of the lifting device. When the openings (3) are open, airlows through the conduit and the static pressure in the conduit falls and causes an internal suction that draws the flexible skin into the recess (es). The internal suction disappears when the openings (3) are closed and the flexible skin returns to the same plane as the skin.

Alternatively, the openings (3) may always remain open during flight. The static pressure in the conduit is determined by the flight conditions, e.g., flight regimens. Under certain flight regimen(s), the pressure in the conduit is sufficiently low that the flexible skin(s) are drawn into the recesses.

The openings (3) would preferably be located in the surface of the lifting surface having a negative pressure gradient or what is the same, wherein the suction pressures are produced instead than in the positive pressures face of the lifting surface.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:
1. An aerodynamic lifting device comprising:
   a movable discontinuity located in a surface of the lifting device, the movable discontinuity being movable between:
   an active position in which the movable discontinuity is a vortex generator, and
   a passive position in which the movable discontinuity is aligned with the surface such that a profile of the surface is not interrupted by the movable discontinuity in the passive position,
   a conduit located in the lifting device and oriented along a spanwise direction of the lifting device, wherein the conduit is in fluid communication with the movable discontinuity,
   the lifting device further comprising openings in the surface, wherein the openings are spanwise distant from each other and each are in fluid communication with the conduit, and the openings are arranged such that while the openings are open an airflow enters through one of the openings, flows through the conduit and exits from the other opening,
   wherein the movable discontinuity and the conduit are configured such that the airflow flowing through the conduit moves the movable discontinuity to the active position.

2. The lifting device, according to claim 1 wherein the movable discontinuity is located at a region of the lifting device near a trailing edge of the lifting device.

3. The lifting device according to claim 1 wherein the openings are configured to be closed or opened in response to a command from the aircraft.

4. The lifting surface, according to claim 1 wherein the openings are located in a portion of the surface configured to be exposed to a negative pressure gradient during flight.

5. The lifting device according to claim 1 wherein the movable discontinuity comprises a first part movable between the active position in which discontinuity is deployed from the surface of the surface and a passive position in which the discontinuity is located in a recess of the surface.

6. The lifting device, according to claim 5 wherein the movable discontinuity comprises a hinge line configured to move the first part between the active and passive positions.

7. The lifting device, according to claim 5 wherein the movable discontinuity further comprises a second part rigidly connected to the first part and movable between the active position in which the discontinuity is located in a recess of the surface covering said recess and the passive position in which the discontinuity is located in the conduit.

8. The lifting device according to claim 1 wherein the discontinuity comprises a part of a flexible skin of the surface, the flexible skin being movable between the passive position in which the flexible skin is located following an aerodynamic profile of the lifting surface and the active position in which the flexible skin departs from the aerodynamic surface be the vortex generator.

9. The lifting surface according to claim 8 wherein the flexible skin is sucked into a recess in the surface.

10. The lifting device according to claim 9 wherein the recess is located between consecutive ribs within the lifting device.

11. An aircraft, comprising a lifting surface according to claim 1.

12. A wing of an aircraft comprising:
a leading edge;
an trailing edge;
an upper skin surface extending from the leading edge to the trailing edge;
a movable discontinuity located on the upper skin surface, wherein the movable discontinuity is located at a region of the wing closer to the trailing edge than to the leading edge of the wing, and the movable discontinuity is configured to move between:
an active position in which the movable discontinuity is a vortex generator, and
a passive position in which the movable discontinuity is aligned with the upper skin surface such that a profile of the upper skin surface is not interrupted by the movable discontinuity in the passive position,
a conduit in the wing and oriented along a spanwise direction of the wing, wherein the conduit is aligned with the movable discontinuity, and wherein air pressure in the conduit is a motive force which moves the moveable discontinuity between the active position and the passive positions.

13. The wing of claim 12 further comprising first and second openings in the surface on opposite sides of the movable discontinuity along the spanwise direction, wherein the first and second openings are in fluid communication with the conduit, the first and second openings are arranged such that air flowing over the surface of the wing enters the first opening and exits the second opening, and the pressure in the conduit is determined by the air flow through the first and second openings.

14. The wing of claim 12 wherein the openings are configured to be closed or opened in response to a command from the aircraft.

15. The wing of claim 12 wherein the movable discontinuity comprises a vane, a hinge and a cover perpendicular to the vane, wherein the vane and cover are fixed to the hinge and the hinge is mounted to the surface and oriented in a chordwise direction,
wherein the vane extends outward from the surface and the cover is seated in an opening of the surface while the movable discontinuity is in the active position,
wherein the vane is seated in the opening and the cover extends inward into the conduit while the movable discontinuity is in the passive position, and
wherein the movable discontinuity pivots about the hinge between the active and passive positions.

16. The wing of claim 12, wherein the discontinuity includes a flexible skin of the surface and the flexible skin is over the conduit, wherein the flexible skin deflects into the conduit while pressure in the conduit is low and is aligned with a profile of the surface while the pressure in the conduit is high.

* * * * *